United States Patent

Iiyama et al.

[11] Patent Number: 5,949,826
[45] Date of Patent: Sep. 7, 1999

[54] DATA TRANSMISSION AND RECEPTION SYSTEM

[75] Inventors: Keiichi Iiyama, Hirakata; Itsuo Takamiya, Moriguchi; Masayuki Arai, Tokyo; Akihisa Yamazaki, Higashikurume; Seiki Yokozeki, Yamatokoriyama, all of Japan

[73] Assignee: Matsushita Electric Industrial Co., Ltd., Japan

[21] Appl. No.: 08/772,004

[22] Filed: Dec. 19, 1996

[30] Foreign Application Priority Data

Dec. 22, 1995 [JP] Japan ................................. 7-334397
Dec. 22, 1995 [JP] Japan ................................. 7-334398
Dec. 22, 1995 [JP] Japan ................................. 7-334399
Apr. 24, 1996 [JP] Japan ................................. 8-127915

[51] Int. Cl.[6] .................................................. H04L 27/10
[52] U.S. Cl. ........................ 375/279; 375/320; 375/322; 332/102; 332/105
[58] Field of Search ................................... 327/110, 588; 360/46; 340/825.57, 825.58; 375/309, 310, 308, 320, 322, 329, 279; 329/305, 326, 342; 332/105, 102, 130

[56] References Cited

U.S. PATENT DOCUMENTS 3,764,926 10/1973 Rypinski, Jr. ............................ 329/305
4,654,880 3/1987 Sontag ....................................... 455/41
4,893,118 1/1990 Lewiner et al. ..................... 340/825.54
5,293,400 3/1994 Monrod et al. .......................... 375/257
5,519,729 5/1996 Jurisch et al. ............................ 375/259

*Primary Examiner*—Chi H. Pham
*Assistant Examiner*—Emmanuel Bayard
*Attorney, Agent, or Firm*—Parkhurst & Wendel

[57] ABSTRACT

A data transmission and reception system according to this invention comprises a transmitter for transmitting data by modulating transmit data and a receiver for receiving and demodulating a signal from the receiver, wherein the receiver includes a parallel resonator for receiving a PSK signal; a full rectification circuit for detecting output from the parallel resonator; a low pass filter for shaping the waveform of output from the full rectification circuit; and a comparator for converting output from the low pass filter into a binary-coded signal so that demodulated signals can be obtained from the output of the comparator. Therefore, PSK signals can be demodulated without a PLL or a tank circuit, the overall system consumes a smaller amount of power and is thin and reliable, the transmitter has an amplifier that can operate efficiently, particularly with a limited power supply as in IC cards or a single power supply used for portable terminals, and the receiver is reliable even with a simple circuit using a communication method that locally suppresses the amplitude at phase change points to remove an oscillation circuit in order to reduce the size and thickness of the device.

6 Claims, 21 Drawing Sheets

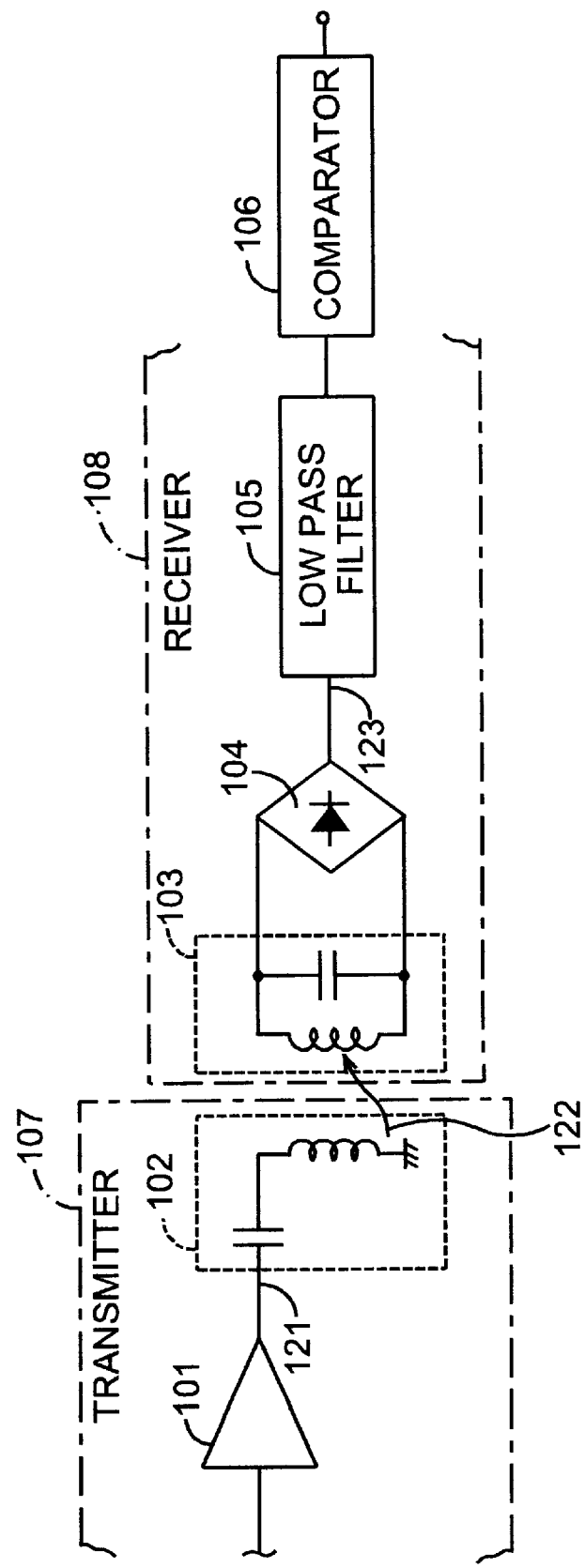

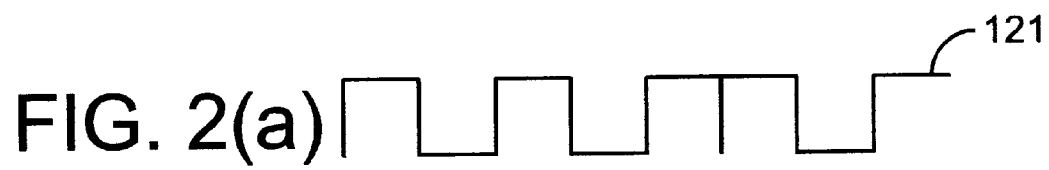
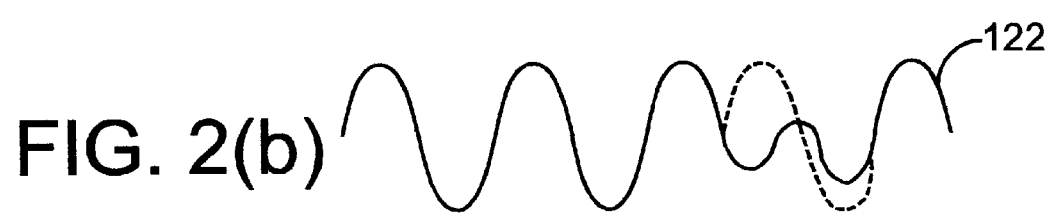
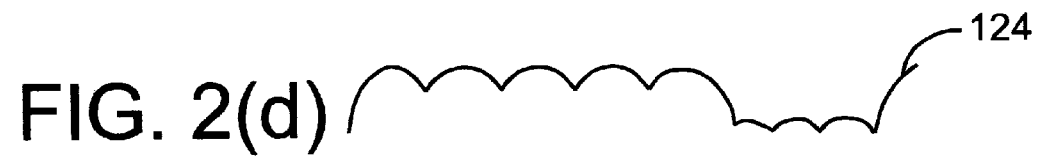

FIG. 10(a) RECEIVE SIGNAL 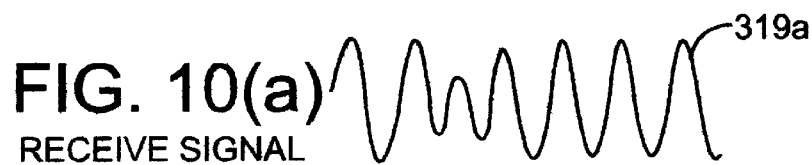
FIG. 10(b) INPUT SIGNAL 
FIG. 10(c) FIRST BINARY-CODED SIGNAL 
FIG. 10(d) SECOND BINARY-CODED SIGNAL — PHASE DELAY 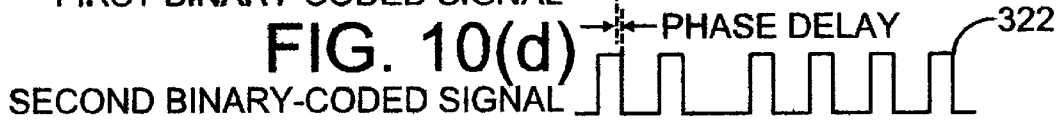
FIG. 10(e) THIRD BINARY-CODED SIGNAL 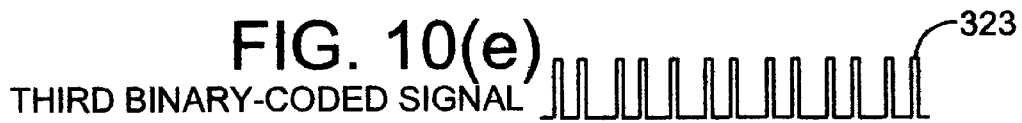
FIG. 10(f) FREQUENCY-DIVIDED SIGNAL 
FIG. 10(g) FIRST DETECTION SIGNAL 

FIG. 11(a) RECEIVE SIGNAL 
FIG. 11(b) INPUT SIGNAL 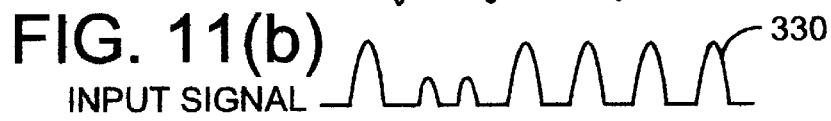
FIG. 11(c) FIRST BINARY-CODED SIGNAL 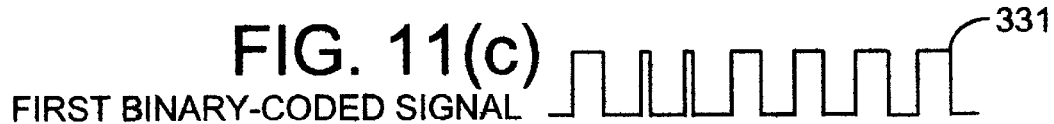
FIG. 11(d) SECOND BINARY-CODED SIGNAL 
FIG. 11(e) THIRD BINARY-CODED SIGNAL 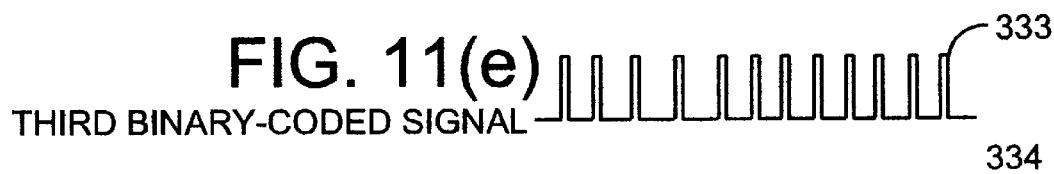
FIG. 11(f) FREQUENCY-DIVIDED SIGNAL 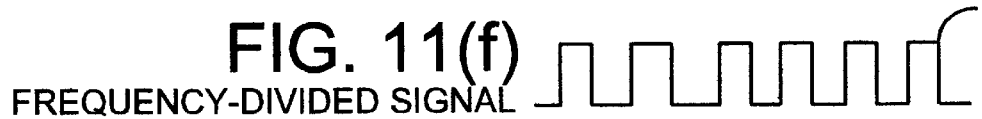
FIG. 11(g) FIRST DETECTION SIGNAL 

~211

~212

~213

~214

~215

DATA TRANSMISSION AND RECEPTION SYSTEM

FIELD OF THE INVENTION

The present invention relates to a data transmission and reception system comprising a transmitter for transmitting data by modulating transmit data and a receiver for receiving and demodulating signals from the transmitter, and in particular, to a receiver that is applicable to thin and small coin- or card-shaped IC cards, or portable transceivers and which communicates with a reader writer to transmit and receive commands or read data without contacts. The present invention improves a circuit for receiving processing, in particular, a demodulating circuit to reduce the thickness and size of the device.

PRIOR ART

Data transmission and reception systems comprising a transmitter for transmitting data by modulating transmit data and a receiver for receiving and demodulating signals from the transmitter have been commonly used.

In such data transmission and reception systems, an amplifier for supplying a current to an output load circuit in the transmitter is required to allow the transmitter to output as electric waves various signals such as PSK and ASK signals. On the other hand, receivers using communications through electromagnetic coupling are known and used for IC cards (responders) which can be accessed by transmitters such as reader writers (interrogators) even without contacts.

Common communication methods for the data transmission and reception system include digital modulation methods such as amplitude shift keying (ASK), phase shift keying (PSK), and differential phase shift keying (DPSK).

FIG. 17 shows one example of the configuration of a conventional data transmission and reception system based on the ASK method. This system comprises a transmitter 4010 and a receiver 4020.

The transmitter 4010 modulates the amplitude of a carrier of several hundred kHz according to the ASK method to generate a transmit signal A4, which is then amplified by a driver 4011 configured as an amplifier. The amplified signal is used to current-drive an antenna coil 4012 for electromagnetic conversion in order to send a magnetic signal B4 according to the ASK method.

When the receiver 4020 receives the magnetic signal B4, a reception circuit 4030 executes reception according to the ASK method by converting the signal B4 into a receive signal C4 and using an ASK demodulator 4040 to recover it to its original state as a demodulated signal D4. The demodulated signal D4 is bit-serially input to a sampling circuit 4050. in which it is converted into parallel data, which is then loaded in a processor 4060 comprising an MPU. The processor 4060 then executes specific processing according to the contents of the data.

The reception circuit 4030 comprises an antenna coil 4031 electromagnetically coupled to the antenna coil 4012 and a capacitor 4032 connected in parallel thereto to constitute a parallel resonant circuit, and electromagnetically converts the magnetic signal B4 into the receive signal C4. A diode bridge 4033 and a smoothing circuit 4034 are connected in parallel to the antenna coil 4031 and the capacitor 4032 to enable a power supply voltage VcC to be supplied to the processor 4060 without a battery. Alternatively, this configuration can supplement the output of a battery. That is, a carrier is used to receive not only communicated data but also operation power.

The ASK demodulator 4040 generates the demodulated signal D4 by using a BPF 4040a (a band pass filter) to extract effective carrier-corresponding-components from the receive signal C4, then using a rectification circuit 4040b to rectify them, and then passing the rectified components through an LPF 4040 c (a low pass filter) to detect an envelope.

The sampling circuit 4050 and the processor 4060 that process the demodulated signal D4 comprise synchronous digital circuits. The receiver 4020 has an oscillator 4070, and the processor 4060 operates in response to a clock E4 from the oscillator 4070.

The oscillator 4070 comprises a ceramic oscillating element for stabilizing an oscillating frequency; and a charging and discharging capacitor. The oscillator 4070 generates an oscillation signal by repeating charging and discharging according to the natural oscillation and sends it out as the clock E4.

FIG. 18 shows one example of the configuration of a conventional data transmission and reception system according to the PSK method. This system comprises the transmitter 4010 and a receiver 4021.

The transmitter 4010 is almost the same as the one described above, but differs therefrom in that the phase of the transmit signal A4 in modulated according to the PSK method. The receiver 4021 is different from the receiver 4020 in the demodulating and the clock producing methods.

For the clock producing nethod, a clock producing circuit 4071 is provided instead of the oscillation circuit 4070 to produce the clock E4 by binary-coding a reproduced carrier from a carrier reproduction circuit 4041b.

For the demodulating method, a PSK demodulator 4041 is provided instead of the ASK demodulator 4040. The PSK demodulator 4041 generates the demodulated signal D4 by using a BPF 4041a to extract effective carrier-corresponding-components from the receive signal C4, using the carrier reproduction circuit 4041b to reproduce the carrier from the extracted signal, using a multiplier 4041c to multiply the extracted signal by the reproduced carrier signal, and passing the resultant signal through an LPP 4041d to detect synchronism.

The carrier reproduction circuit 4041b comprises a circuit for doubling the extracted signal and a PLL circuit that oscillates at the frequency of the carrier while matching its phase with the doubled signal. The carrier reproduction circuit 4041b reproduces a reference signal that does not depend on the phase inverse condition of the receive signal C4 and the phase of which synchronizes with the carrier.

The PLL circuit generally comprises a VCO (a voltage controlled oscillator) and a charging and discharging capacitor.

FIG. 19 shown one example of the configuration of a conventional data transmission and reception system according to the DPSK method. This system comprises the transmitter 4010 and a receiver 4022.

The transmitter 4010 is almost the same as the one described above, but differs therefrom in that the transmit signal A4 in phase-modulated and differentially coded according to the DPSK method.

The receiver 4022 is different from the receiver 4020 in the demodulating and the clock producing methods.

For the demodulating method, a DPSK demodulator 4042 is provided instead of the circuits 4040 and 4041. The DPSK demodulator 4042 generates the demodulated signal D4 by using a BPF 4042a to extract effective carriercorresponding-components from the receive signal C4, by using a delay circuit 4042b to delay the extracted signal by one bit (a unit period used when the phase of the carrier is inverted/non-inverted) in order to generate a delayed signal, using a multiplier 4042c to multiply the extracted signal by the delay signal, passing the resultant signal through an LPF 4042d to detect delay, and canceling the phase modulated state and the differentially coded state.

For the clock producing method, a clock producing circuit 4072 is provided instead of the circuits 4070 and 4071. The clock producing circuit 4072 generates the clock E4 by using a full rectification circuit 4072a to rectify the full wave of the receive signal C4 in order to generate a signal of a double frequency which does not depend on the phase inverted state of the receive signal C4, allowing a tank circuit 4072b to tune to this signal to amplify and extract only the signal of a double frequency, and using a frequency divider 4072c to divide the frequency into two while executing binary-coding.

The tank circuit 4072b is a parallel resonator comprising a coil and a capacitor and intensely resonates at an resonant frequency while causing charging and discharging. The coil is not of a print pattern but of an individual chip due to the need to decouple it from the antenna coil 4031 normally composed of a print pattern.

Next, a conventional amplifier used as a driver 4011 for driving an output load circuit in a receiver in the data transmission and reception system in each of the above conventional examples is described with reference to the case in which it is used for the PSK modulation method.

FIG. 20 is a block diagram of an amplifier in the data transmission and reception system in each of the above conventional examples, showing a D-class amplifier with a single power supply.

In FIG. 20, 221 is a P channel FET, 222 is an N channel FET, 223 is an input terminal, and 224 in an output load circuit.

The gates of the P channel FET 221 and the N channel FET 222 are connected together to constitute an input terminal 223, and the connection point between the P channel FET 221 and the N channel FET 222 is connected to one terminal of the output load circuit 224 with the other terminal of the output load circuit 224 grounded.

The operation of a conventional amplifier as described above is explained below.

A PSK-modulated input signal is input to the gate of each FET from the input terminal 223. When the input signal at an "H" level, the P channel FET 221 is turned on, while the N channel FET 222 in turned off. Thus, a voltage is supplied to the output load circuit 224 from a power supply line Vcc. Conversely, when the input signal is at an "L" level, the P channel FET 221 is turned off, while the N channel FET 222 is turned on. Thus, the charges stored in the output load circuit 224 are discharged to a ground line through the N channel FET 222.

In this manner, oscillating energy is provided to the output load circuit 224 so that electromagnetic waves will be output from the coil constituting the output load circuit 224.

FIG. 21 is a block diagram of another amplifier in the data transmission and reception system in each of the above examples, showing a D-class amplifier with a double power supply.

This amplifier is different from the D-claims amplifier with a single power supply in FIG. 20 in that the source of the N channel FET 222,is connected to a negative power supply -Vcc. In addition, since at the TTL level, an output circuit comprising a P and an N channel FETs cannot be driven, a voltage amplifier 225 is required. The other operation is the same as in the case of a single power supply.

The publicly known data transmission and reception system of this kind has the following disadvantages.

If, for example, the amplifier in the above data transmission and reception system has a single power supply, it is not always supplied with currents from the power supply, resulting in the inefficient provision of currents. Thus, a separate power supply is required to obtain large currents. For the double power supply, since currents are supplied from the power line whether the input signal level is "H" or "L", currents can be provided efficiently. Thus, this system requires a negative power supply and also requires the voltage amplifier 225 to drive the FETs.

In addition, the receiver includes the oscillation circuit, the PLL circuit, and the tank circuit, and oscillates while causing charging and discharging. Such charging and discharging requires a large amount of power, necessarily causing a large amount of power to be consumed. This is not preferable for portable transceivers powered by a battery because the life expectancy of the battery is reduced. It is also inconvenient for IC cards powered only by a communication carrier instead of a battery because the communication distance is limited if a large amount of power is consumed.

In addition, the inclusion of coils for individual elements and ceramic oscillating elements prevents the reduction of the size and thickness of the receiver. The receiver of this configuration is inconvenient for IC cards the value of which depends on their convenience and which must meet the need to reduce their thickness.

DISCLOSURE OF THE INVENTION

This invention is provided in view of the above disadvantages. It is an object of this invention to provide a data transmission and reception system wherein the overall system consumes a small amount of power and is thin and reliable, wherein the transmitter has an amplifier that can operate efficiently, particularly with a limited power supply as in IC cards or a single power supply used for portable terminals, and wherein the receiver is reliable even with a simple circuit using a communication method that locally suppresses the amplitude at phase change points to remove an oscillation circuit in order to reduce the size and thickness of the device.

To achieve this object, the data transmission and reception system according to thin invention comprises a transmitter for transmitting data by modulating transmit data and a receiver for receiving and demodulating a signal from the receiver, wherein the transmitter includes a series resonator to which a PSK signal including the transmit data is provided, and wherein the receiver includes a parallel resonator for receiving the PSK signal; a full rectification circuit for detecting output from the parallel resonator; a low pass filter for shaping the waveform of output from the full rectification circuit; a comparator for converting output from the low pass filter into a binary-coded signal; and a demodulator for obtaining a demodulated signal from the output of the comparator.

According to this data transmission and reception system, the transmitter uses the filtering effect of the series resonator to cause the amplitude of a signal to be depressed at its change points, while the receiver accurately detects the change points by using the full rectification circuit to detect the amplitude of the PSK signal received by the parallel resonator, passing the signal through the low pass filter, and using the comparator to binary-code it.

The data transmission and reception system according to this invention comprises a transmitter for transmitting data by modulating transmit data and a receiver for receiving and demodulating a signal from the receiver, wherein the receiver includes an amplitude suppressed point detector for using binary-coding based on comparison to a predetermined threshold to detect suppressed points from a receive signal the amplitude of which has been locally suppressed and sending out a pulse amplitude suppressed point detection signal; a demodulator for carrying out demodulation based an the amplitude suppressed point detection signal; and an internal circuit for executing processing depending on a demodulated signal from the demodulator, and also includes a waveform shaping circuit for outputting a single pulse signal of a predetermined width when there are one or more pulses in the amplitude suppressed point detection signal within a predetermined period that is longer than a local period in which the amplitude of the receive signal is suppressed, and wherein the demodulator carries out demodulation based on the output of the waveform shaping circuit instead of the amplitude suppressed point detection signal.

According to this data transmission and reception system, the demodulator perforas a normal demodulating operation based on a single pulse even when during the detection of amplitude suppressed points, all the noises in the receive signal cannot be removed, causing the waveform of the pulse in the amplitude suppressed point detection signal to be broken as in chattering, thereby causing a plurality of pulses to be output for a signal amplitude suppressed point.

In addition, this data transmission and reception system comprises a transmitter for transmitting data by modulating transmit data and a receiver for receiving and demodulating a signal from the receiver, wherein the transmitter includes a series resonator to which a PSK signal including the transmit data are provided, and wherein the receiver includes a rectification circuit for rectifying a received PSK modulated signal; an amplifier for outputting a first binary-coded signal obtained by binary-coding an output signal from the rectifying circuit; a change point suppression circuit for outputting a second binary-coded signal obtained by suppressing those portions of the first binary-coded signal from the amplifier, which are located near the change points of the PSK modulated signal; an edge detector for outputting, based on the first binary-coded signal from the amplifier and the second binary-coded signal from the change point suppression circuit, a third binary-coded signal comprising a signal obtained by detecting the edge of the second binary-coded signal and those portions of this signal near the change points which have been suppressed by the change point suppression circuit; a frequency divider for outputting a frequency-divided signal obtained by dividing the third binary-coded signal from the edge detector; and a phase comparator for comparing the first binary-coded signal from the amplifier to the frequency-divided signal from the frequency divider to detect the change points of the phase.

This data transmission and reception system eliminates the need of a tank or a PLL circuit conventionally required to generate a clock used for a modulator for the PSK signal. The PSK signal can be demodulated correctly because a signal is ensured to be detected at a change point regardless of the change in the state of the change point. Furthermore, when electric waves without signals are being received, the clock has the same frequency accuracy as the carrier and can be used as a clock for modulating the transmit signal.

This data transmission and reception system comprises a transmitter for transmitting data by modulating transmit data and a receiver for receiving and demodulating a signal from the transmitter, wherein the transmitter has a first P channel FET and a first N channel FET connected in series between the power line and the ground line; and a second P channel FET and a second N channel FET connected in series between the power line and the ground line; a series resonator comprising a capacitor and a coil inserted between the first connection point between the first P channel FET and the first N channel FET and the second connection point between the second P channel FET and the second N channel FET; a first input terminal constituted by connecting the gates of the first P channel FET and the first N channel FET; a second input terminal constituted by connecting the gates of the second P channel FET and the second N channel FET; an invertor for inputting to the second input terminal an inverse of the signal input to the first input terminal for working the above amplifier for using the signal input to the first input terminal to drive the series resonator.

This data transmission and reception system can provide an amplifier that can be driven at the TTL level and which supplies currents efficiently because despite the use of a single power supply, currents are supplied through the power line whether the FETs are turned on or off.

According to a preferred embodiment of this invention, since in the transmitter, the PSK signal including transmit data is provided to the series resonator, while in the receiver, the demodulator obtains a demodulated signal from output from the comparator, the transmitter uses the filtering effect of the series resonator to cause the amplitude of the signal to be depressed at its change points, while the receiver accurately detects the change points by using the full rectification circuit to detect the amplitude of the PSK signal received by the parallel resonator, passing the signal through the low pass filter, and using the comparator to binary-code it.

According to another preferred embodiment of this invention, since the receiver executes demodulation based on a single pulse signal of a predetermined width output by the waveform shaping circuit in response to the amplitude suppressed point detection signal, the demodulator performs a normal demodulating operation based on the single pulse even when during the detection of amplitude suppressed points, all the noises in the receive signal cannot be removed, causing the waveform of the pulse in the amplitude suppressed point detection signal to be broken as in chattering, thereby causing a plurality of pulses to be output for a signal amplitude suppressed point.

According to still another preferred embodiment of this invention, the receiver does not require a tank or a PLL circuit conventionally required to generate a clock used for a demodulator for the PSK signal. The PSK signal can be demodulated correctly because a signal is ensured to be detected at a change point regardless of the change in the state of the change point. Furthermore, when electric waves without signals are being received, the clock has the same frequency accuracy as the carrier and can be used as a signal for modulating the transmit signal.

According to yet another preferred embodiment of this invention, the transmitter includes an amplifier that can be driven at the TTL level and which can supply currents efficiently because despite the use of a single power supply, currents are supplied through the power line whether the FETs are turned on or off.

As described above, the overall system consumes a small amount of power and is thin and reliable, the transmitter has an amplifier that can operate efficiently, particularly with a limited power supply as in IC cards or a single power supply used for portable terminals, and the receiver is reliable even with a simple circuit using a communication method that locally suppresses the amplitude at phase change points to remove an oscillation circuit in order to reduce the size and thickness of the device.

BRIEF DESCRIPTION OF THE INVENTION

FIG. 1 is a block diagram of a data transmission and reception system according to a first embodiment of this invention;

FIGS. 2(a)–2(e) are waveform diagram showing output signals from integral parts of the first embodiment;

Figure 9:
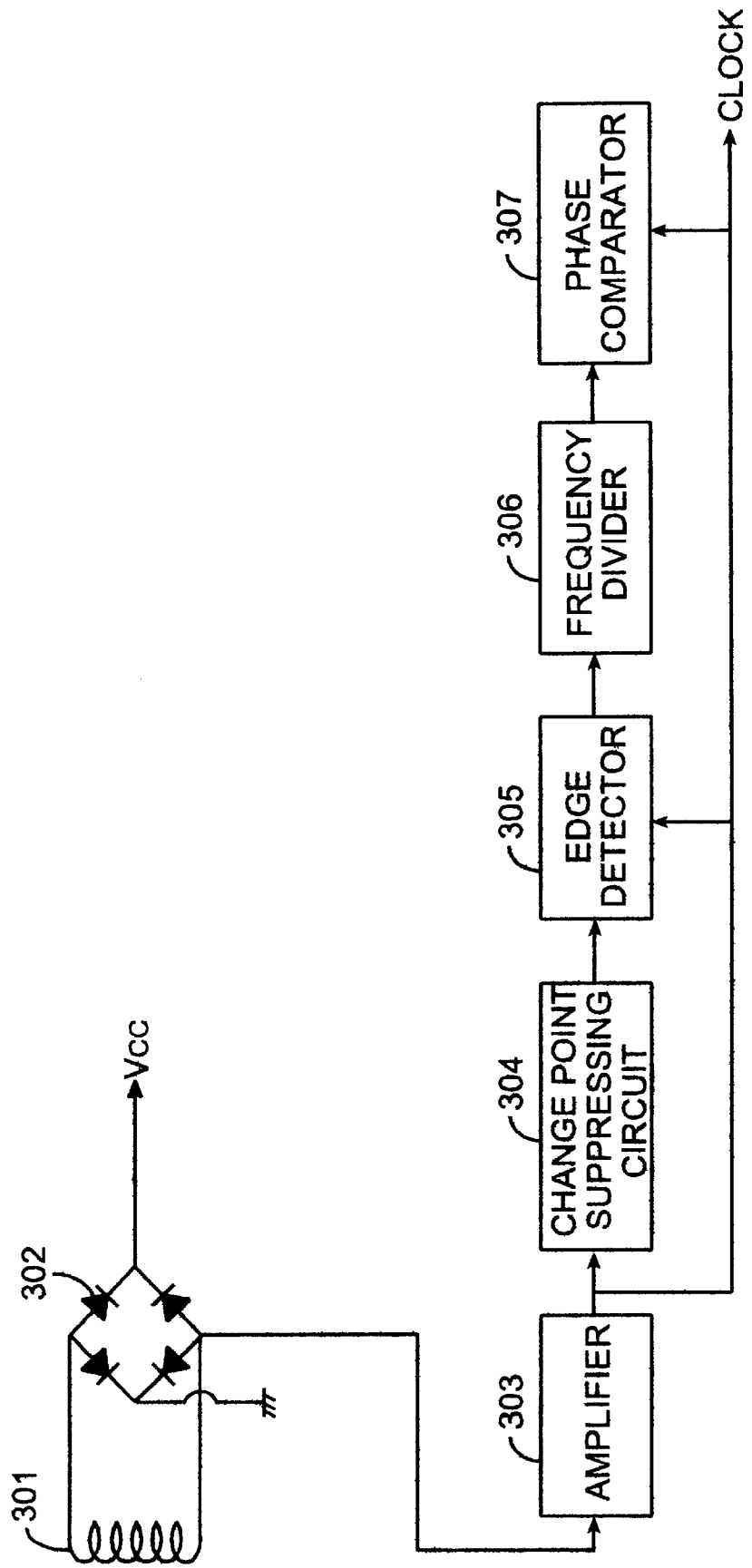
Figure 12:
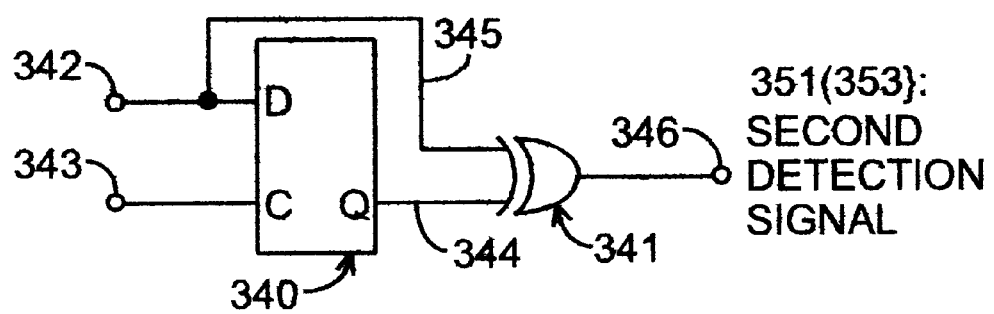
Figure 13A:
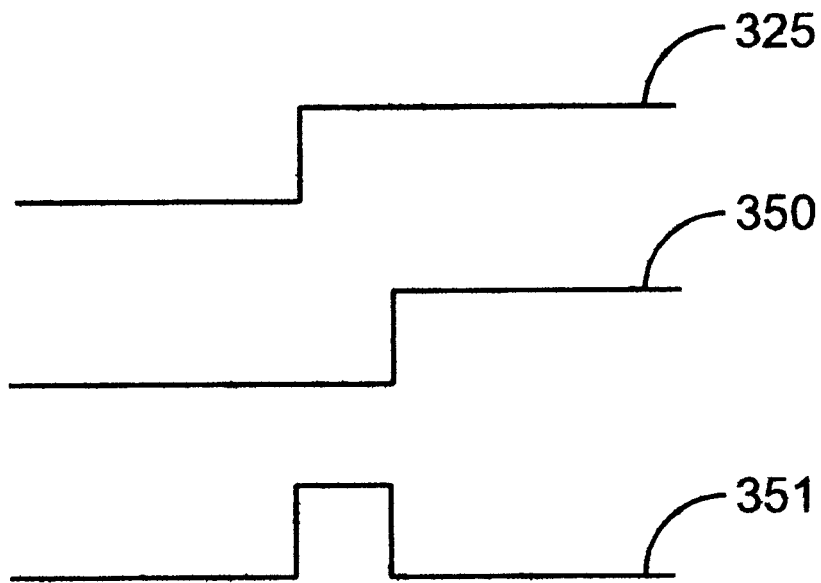
Figure 13B:
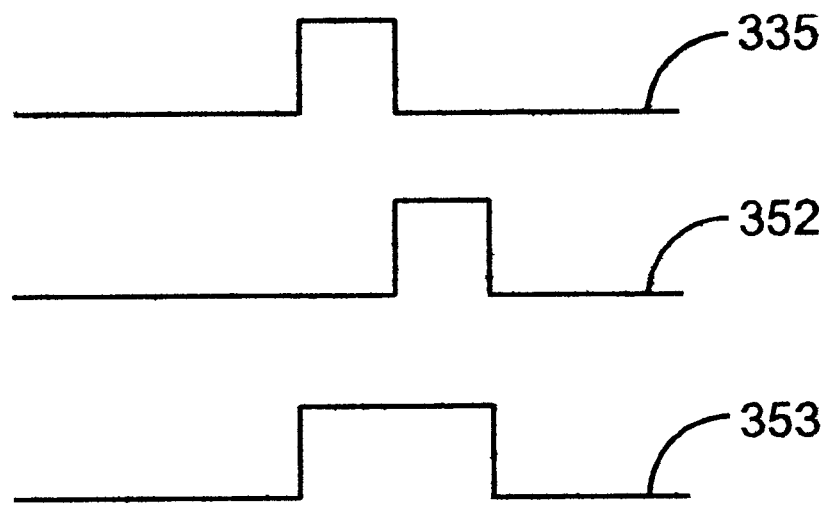
Figure 14:
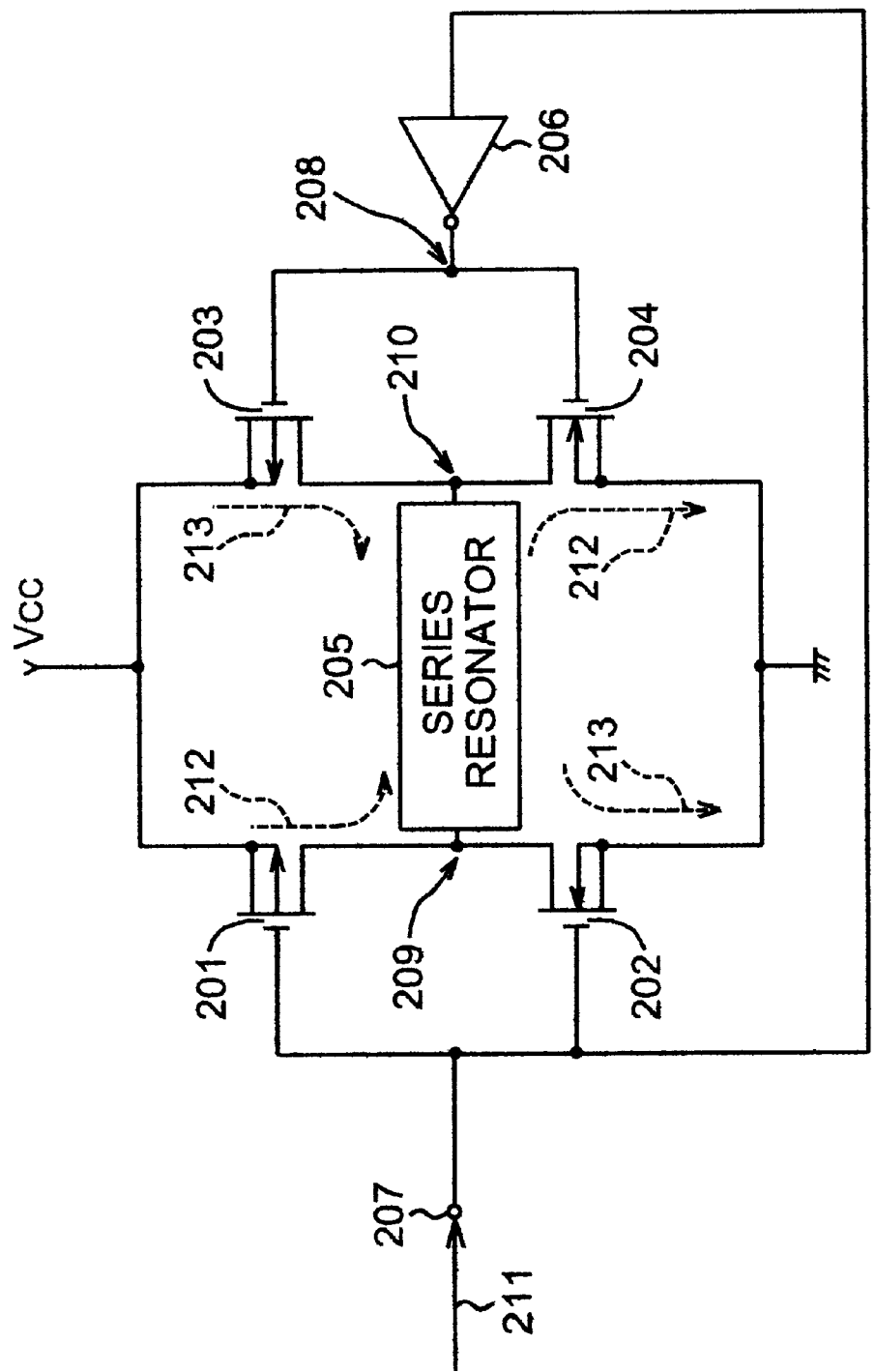
Figure 15A:
Figure 15B:
Figure 15C:
Figure 15D:
Figure 15E:
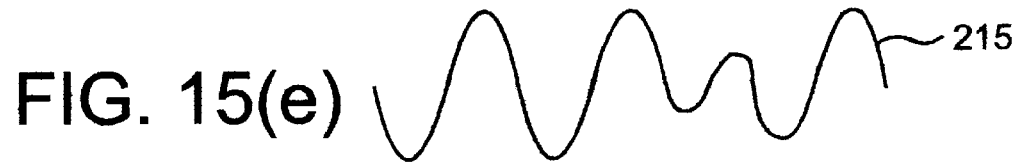
Figure 16:
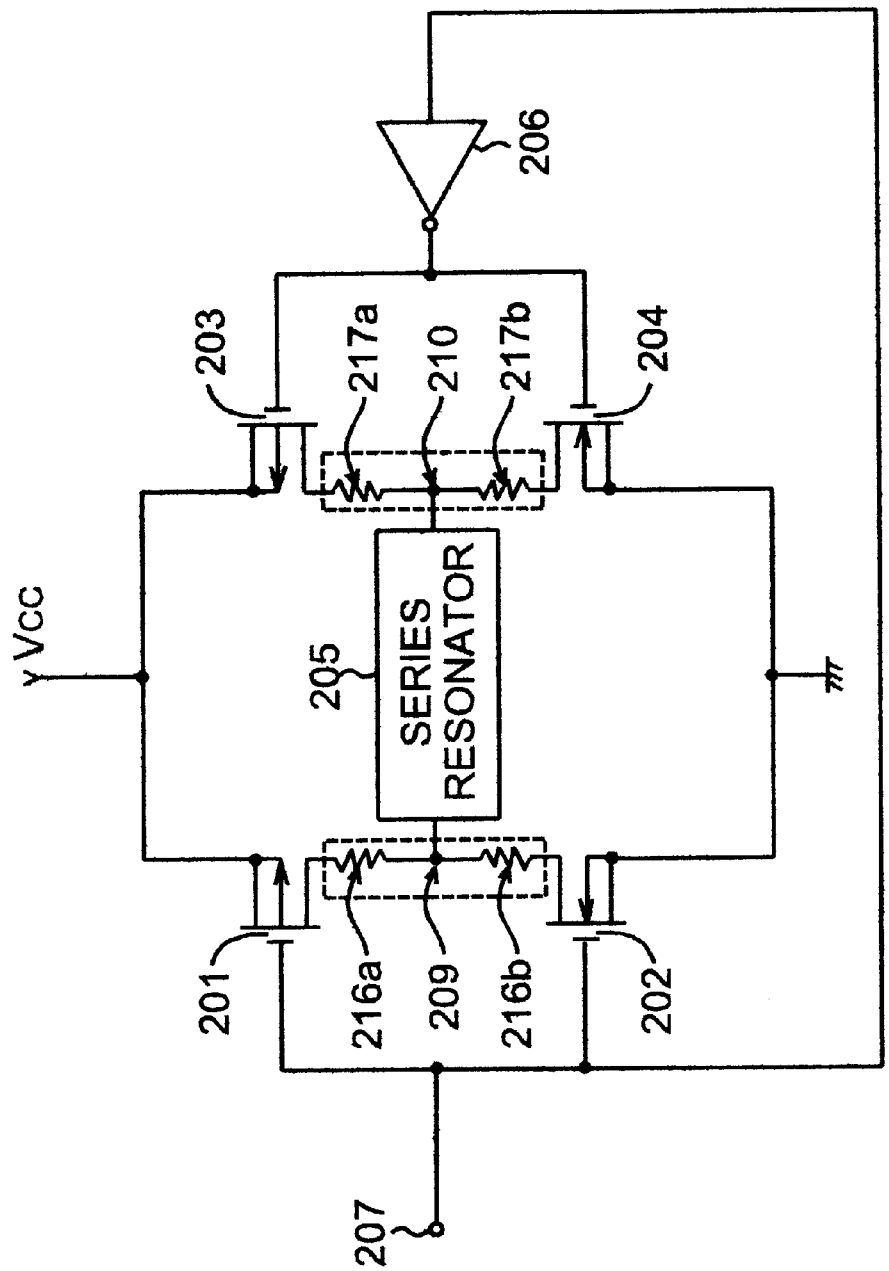
Figure 17:
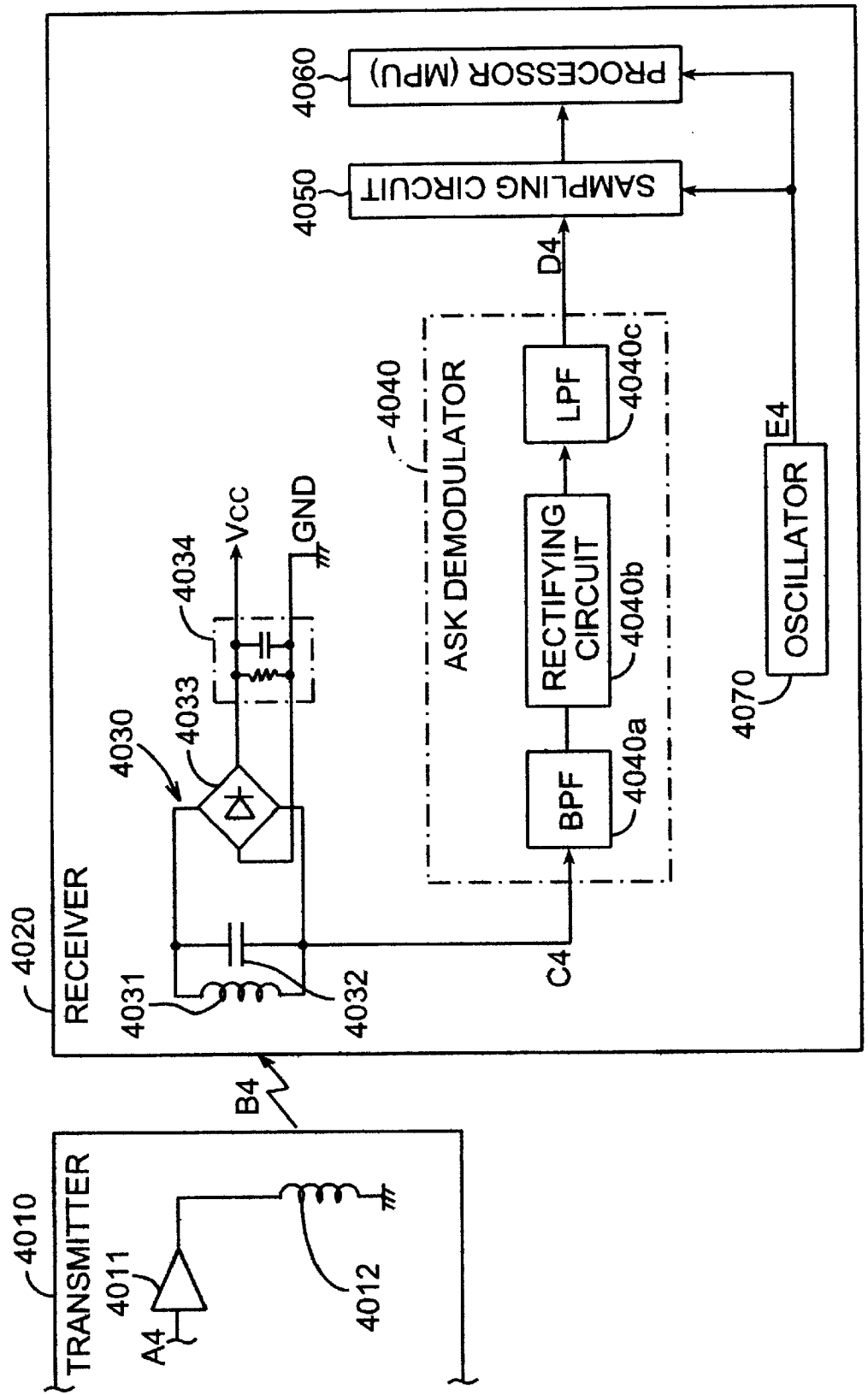
Figure 18:
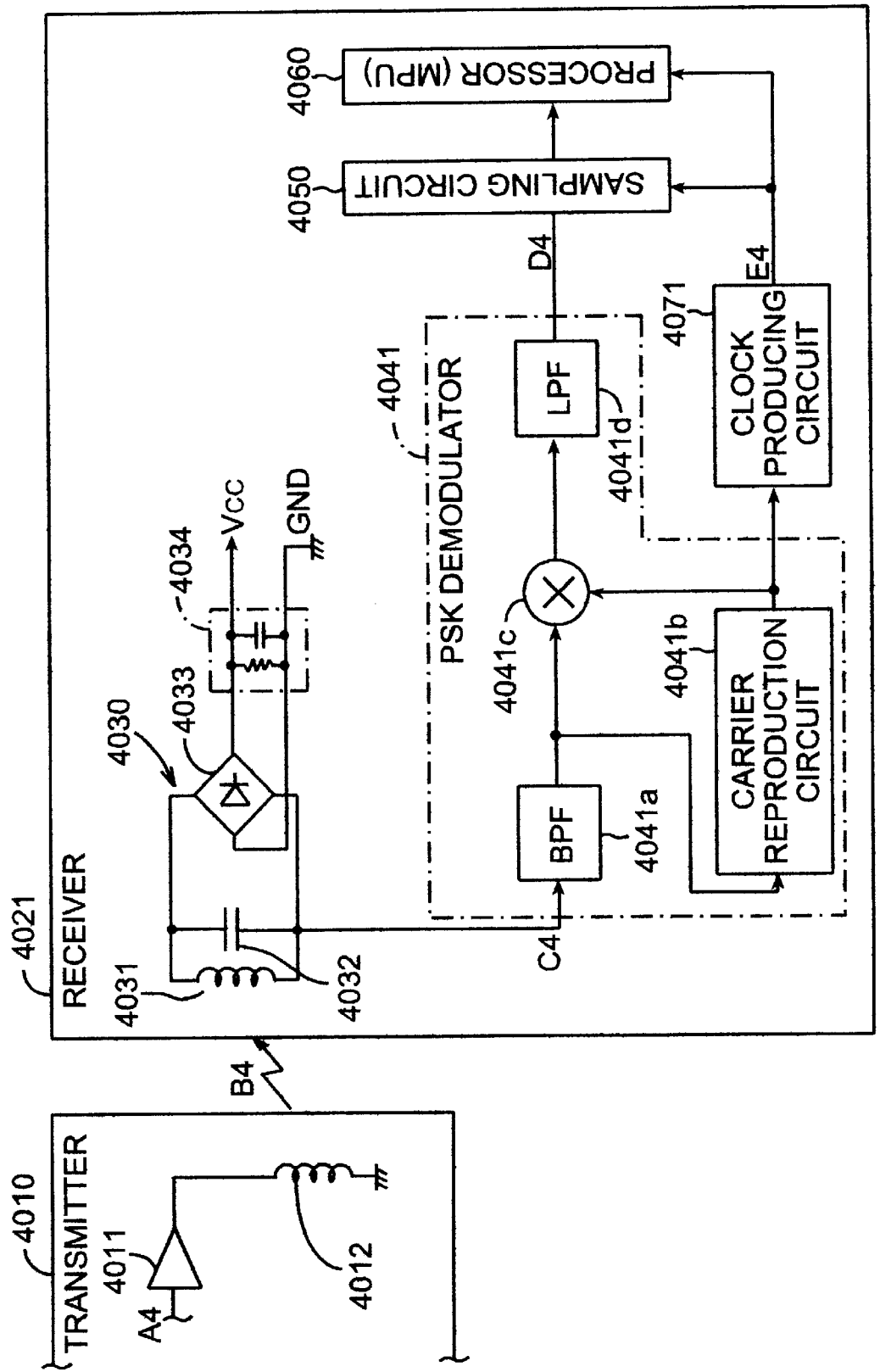
Figure 19:
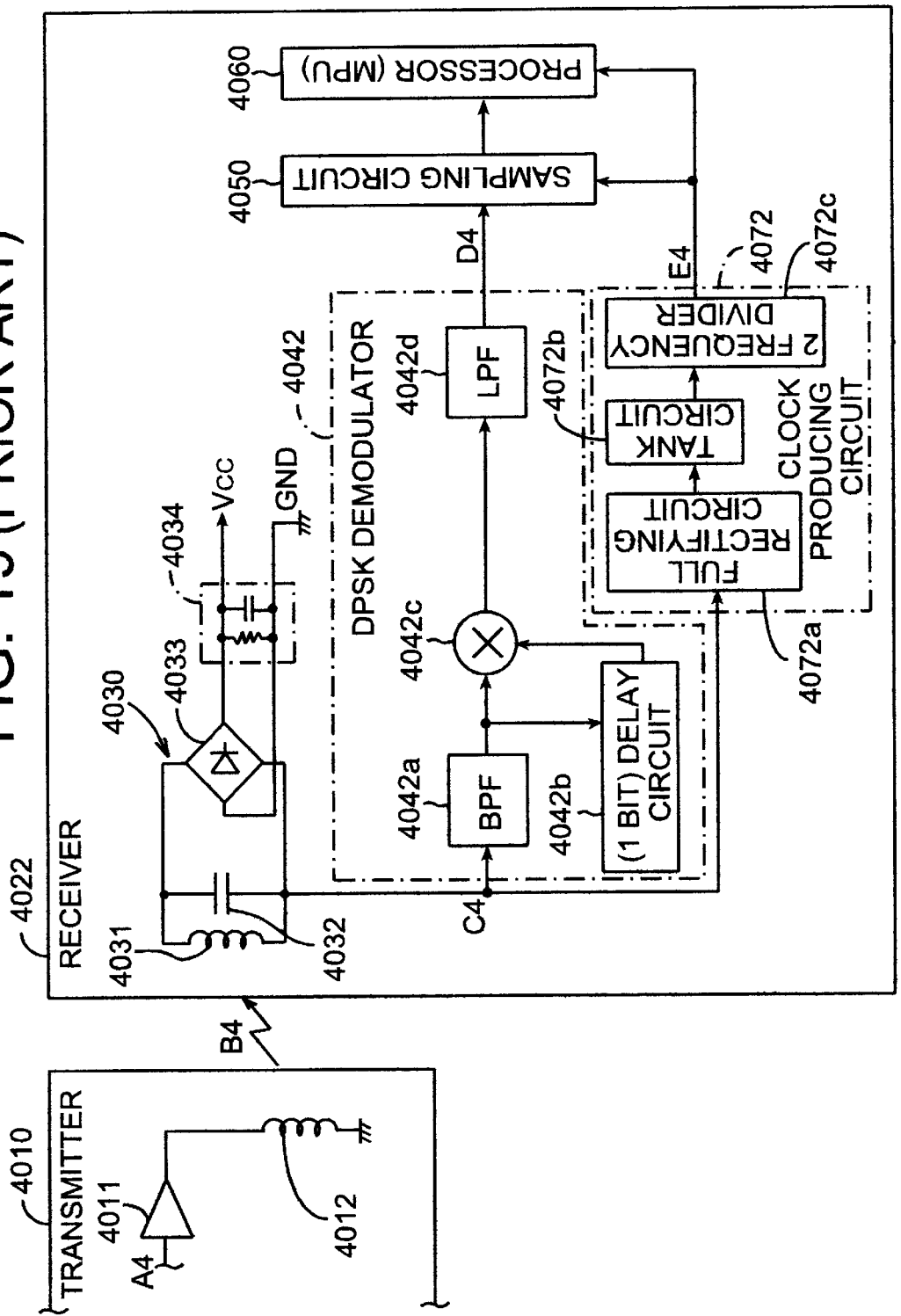
Figure 20:
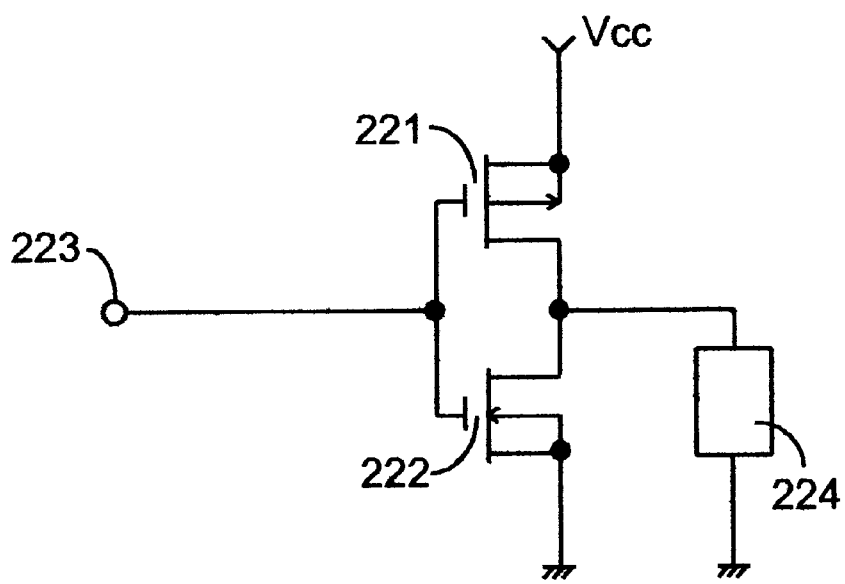
Figure 21:
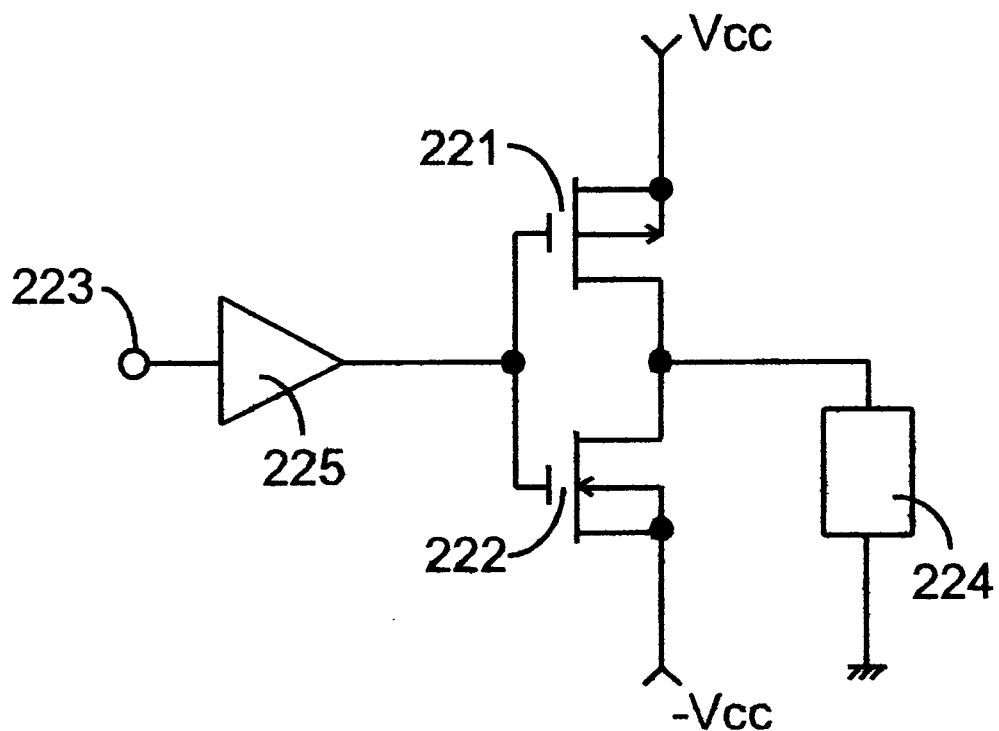

FIGS. 8(a)–(i) are a waveform diagrams showing examples of signals from each part of the differential coding demodulator according to the third embodiment;

FIG. 9 is a block diagram of a demodulator in a data transmission and reception system according to a fourth embodiment of this invention;

FIGS. 10(a)–10(g) are a waveform diagram showing signals according the forth embodiment in response to a PSK signal;

FIGS. 11(a)–11(e) are another waveform diagram showing signals according the forth embodiment in response to a PSK signal;

FIG. 12 is a circuit diagram of a second detection signal producing circuit according to the fourth embodiment;

FIGS. 13(a)–(b) are waveform diagrams showing signals from the second detection signal producing circuit according to the fourth embodiment;

FIG. 14 is a block diagram of an amplifier in a transmitter in a data transmission and reception system according to a fifth embodiment of this invention;

FIGS. 15(a)–15(e) are a waveform diagram showing signals from each part of the amplifier according to the fifth embodiment;

FIG. 16 is a block diagram of an amplifier according to another embodiment;

FIG. 17 is a block diagram showing one example of a conventional data transmission and reception system (ASK);

FIG. 18 is a block diagram showing another example of a conventional data transmission and reception system (PSK);

FIG. 19 is a block diagram showing another example of a conventional data transmission and reception system (DPSK);

FIG. 20 is a block diagram of an amplifier in each of the above conventional data transmission and reception systems; and FIG. 21 is a block diagram of another amplifier.

EMBODIMENTS

The preferred embodiments of thiB invention are shown in FIGS. 1 to 13.

First Embodiment FIG. 1 is a block diagram of a data transmission and reception system according to a first embodiment of this invention. This block diagram shows a transmitter 107 (for example, a reader writer in a non-contact IC card system) that outputs a signal and a receiver 108 (for example, a non-contact IC card) that detects change points. Part of the transmitter 107 includes an amplifier 101 and a series resonator 102, and part of the receiver 108 includes a parallel resonator 103, a diode bridge 104, a low pass filter 105, and a comparator 106.

The configuration shown in FIG. 1 is described in detail with reference to the waveform diagram in FIG. 2 showing signals output from each part of the system.

In the transmitter 107, a PSK signal 121, amplified by the amplifier 101, is input to the series resonator 102. During resonation, the series resonator 102 causes a specified current to flow through a coil using a pure resistance (not shown). Since the series resonator 102 is a kind of filter, its fundamental wave carries the largest current and it cuts the harmonic components. In response to a 180° change in the phase of the PSK signal 121, the current flowing through the coil in the series resonator 102 attempts to continue the vibration of the sine wave. Since, however, the phase of the subsequent PSK signal is inverted, this PSK signal 180° out of phase relative to the residual vibration is subtracted from the first PSK signal to reduce the amplitude, resulting in a depression in the envelope.

This state is shown in the output 122 of the series resonator near a phase change point. In this figure, the broken line shows a signal that is 180° out of phase, while the solid line shows the actual output waveform.

The receiver 108 receives such a PSK signal, but a depression occurs in the output of the parallel resonator 103 in the loosely coupled receiver 108 an in the output 122 of the series resonator 107 in the transmitter 107. By using the detector comprising the diode bridge 104 to detect the amplitude of this signal, using the low pass filter 105 to shape its waveform, and inputting it to the comparator 106, a binary-coded signal at a change point can be obtained.

FIGS. 2(a)–2(e) show changes in these signals. Reference numeral 123 designates a waveform obtained by full rectification by the diode bridge 104, 124 is a waveform shaped by the low pass filter 105, and 125 is a waveform output from the comparator 106. If a binary-coded signal indicating a change point can be obtained as in the output 125 of the comparator 106, demodulation can be executed easily by, for example, differential coding.

Second Embodiment

Although the above embodiment has been described in conjunction with the use of the diode bridge 104 to detect a signal, a binary-coded signal indicating a change point in a signal may also be obtained by providing the rectifier 133 that comprises a combination of diodes and which is separate from the diode bridge 104, and using the output 137 of the diode bridge 104 as a power supply for supplying power to other circuits in order to pass the output of the rectifying circuit 133 through the low pass filter 105 and the comparator 106.

By providing the above configuration to obtain from a receive signal the power supply for supplying power to other circuits, the two diodes in the left half of the diode bridge 104 can also be used ror a diode bridge configuration combined with the rectifying circuit 133, thereby reducing the number of parts used in the device.

Third Embodiment

Next, a demodulated signal processor in a receiver in a data transmission and reception system according to a third embodiment of this invention is explained.

Figure 6:
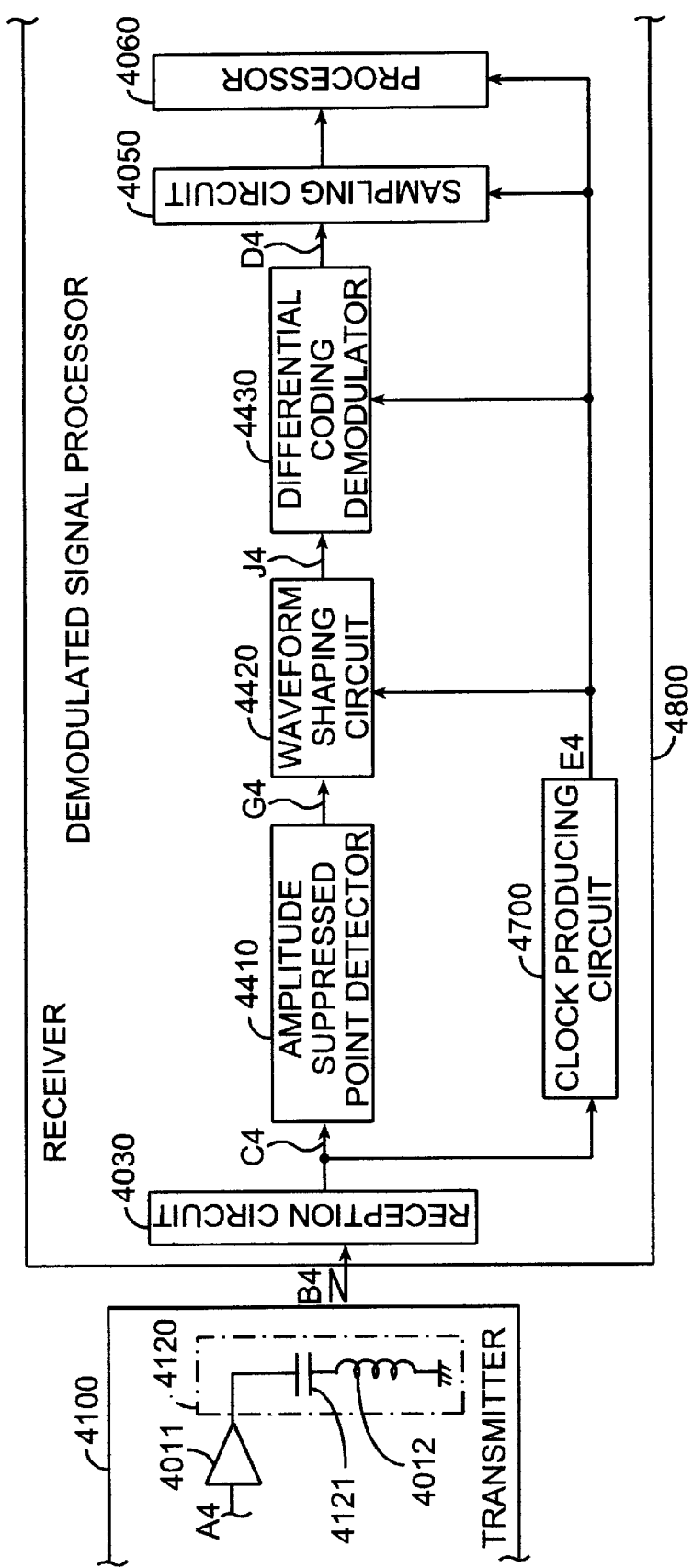
FIG. 6 is a block diagram of a receiver in a data transmission and reception system according to a third embodiment of this invention.
Figure 7:
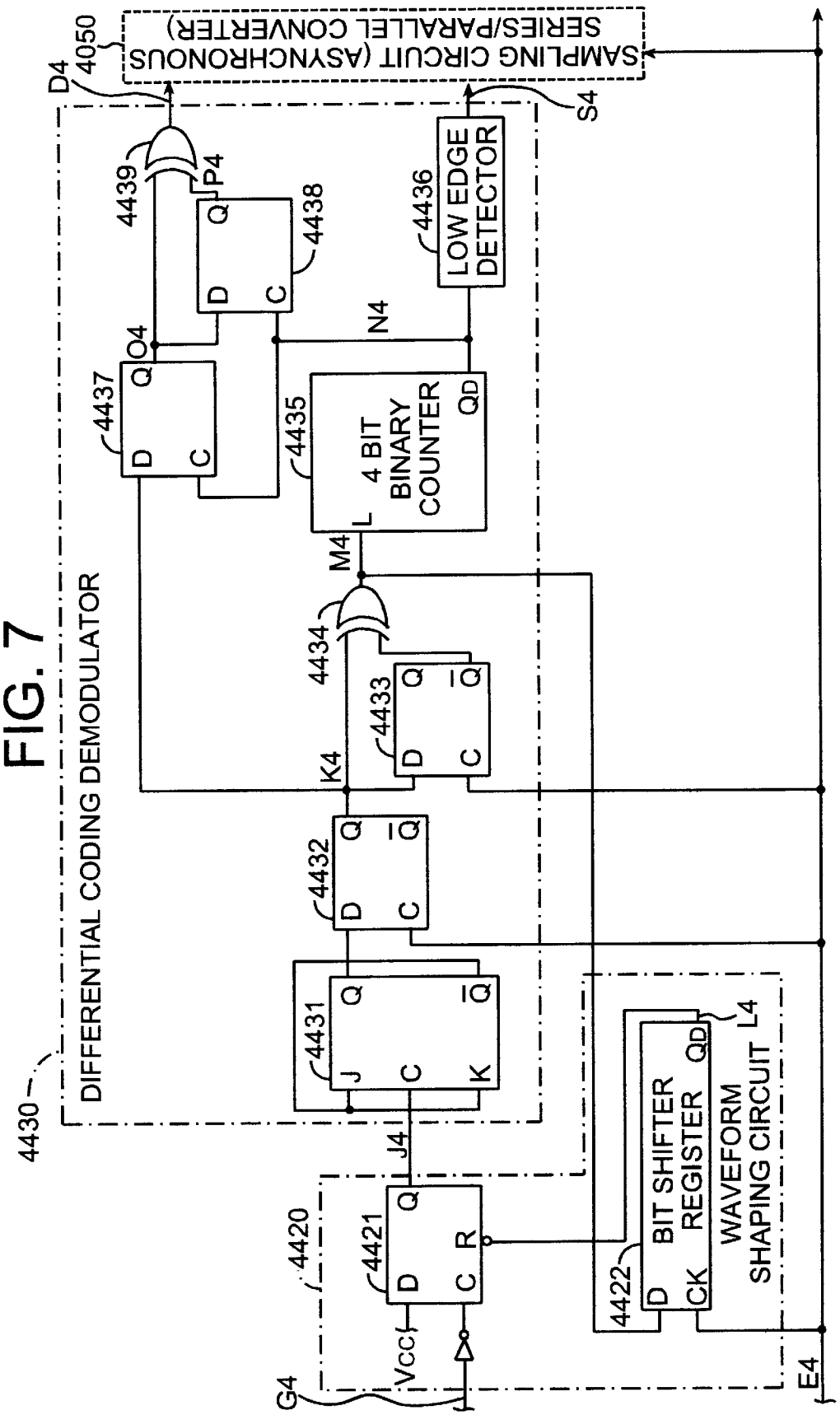
FIG. 7 is a circuit diagram of a differential coding demodulator according to the third embodiment (DPSK)
Figure 8:
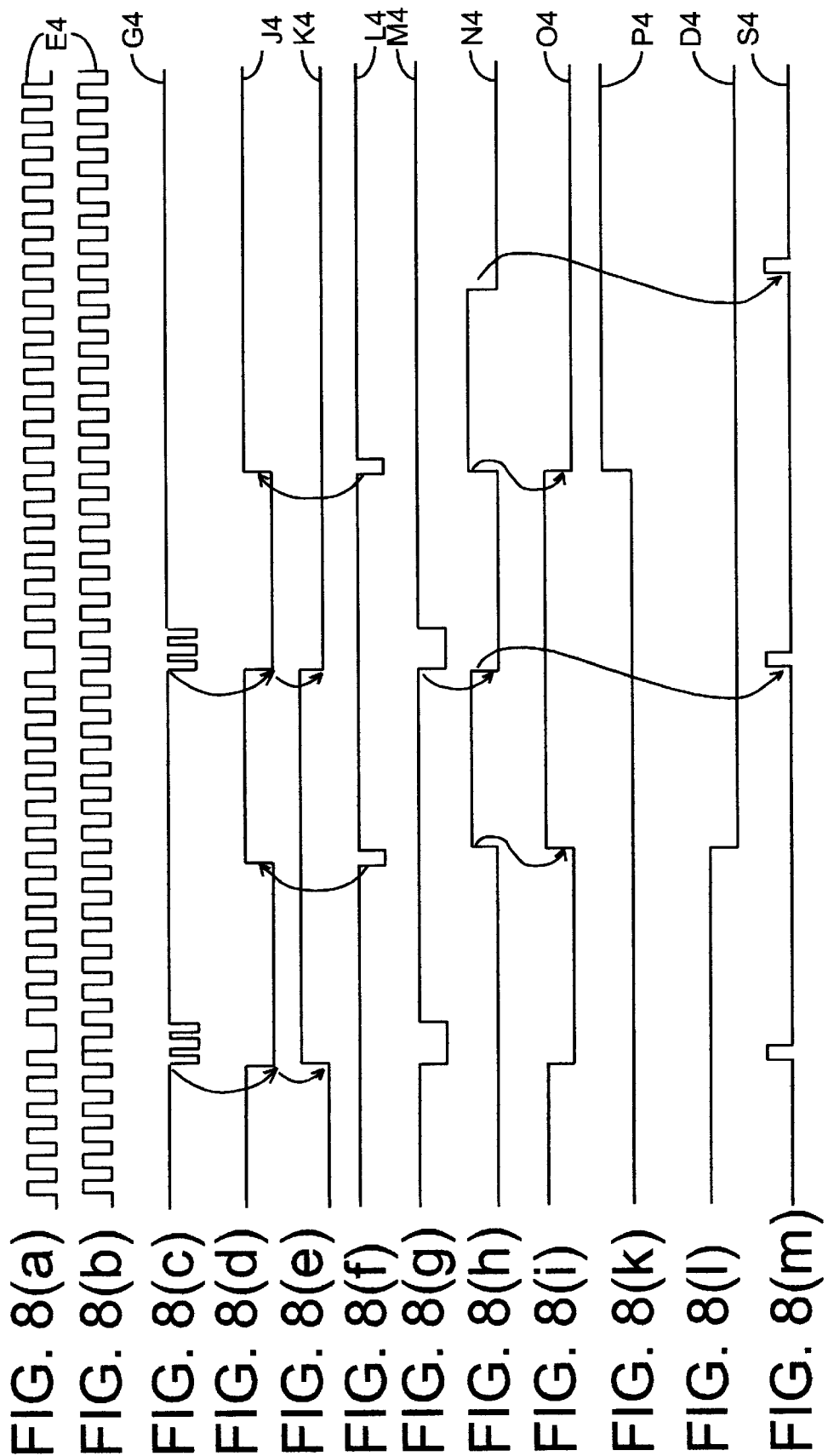

FIG. 6 is a block diagram of the receiver according to this embodiment, FIG. 7 is a circuit diagram of a differential coding demodulator in the receiver shown in FIG. 6, and FIG. 8 shows examples of waveforms of signals from each part of the differential coding demodulator shown in FIG. 7.

Figure 3:
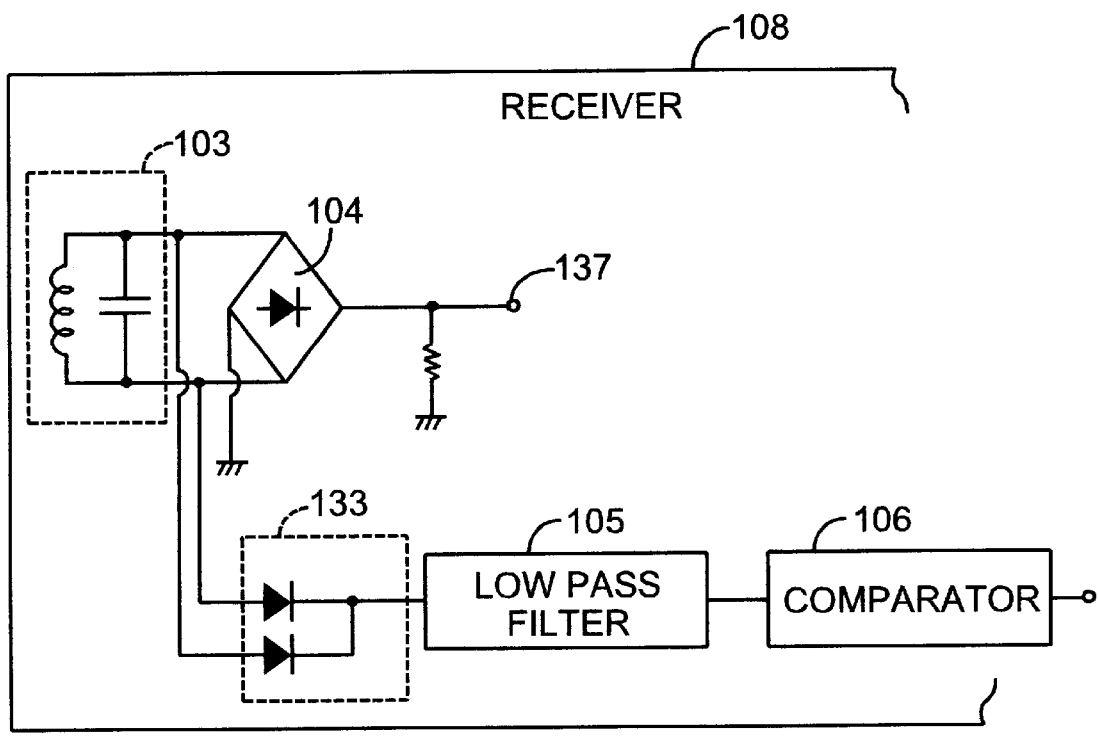
FIG. 3 is a block diagram of a receiver in a data transmission and reception system according to a second embodiment of this invention.
Figure 4:
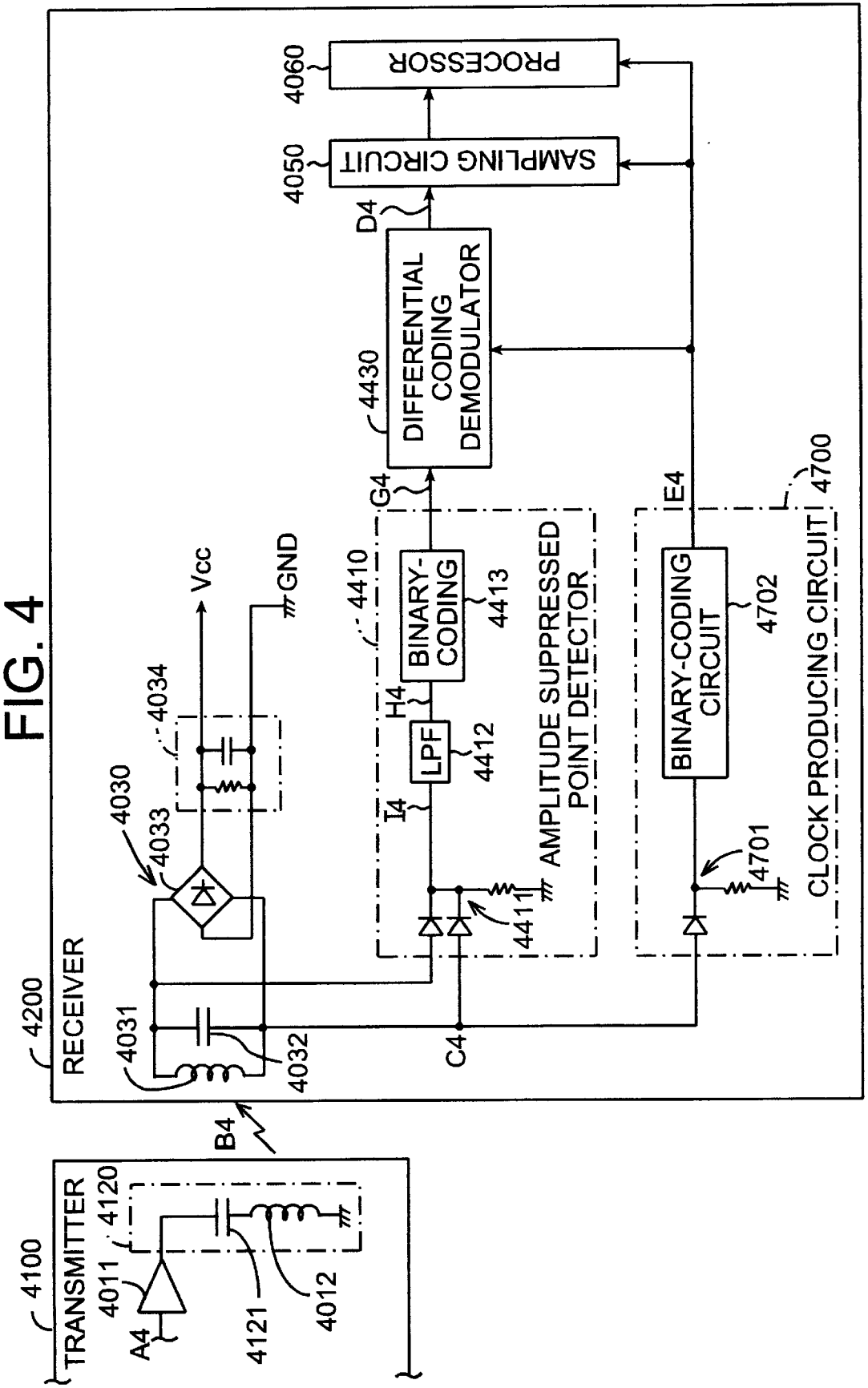
FIG. 4 is an assumed block diagram showing the data transmission and reception system according to the first embodiment with a subsequent stage added thereto.

A receiver 4800 receives a magnetic signal B4 transmitted from a transmitter 4100 in FIG. 4.

A transmitter 4100 comprises an asynchronous series/parallel converter and a modulator which are not shown. The asynchronous series/parallel converter bit-serializes transmit data according to an asynchronization method, and the modulator differentially codes the transmit data, which then modulates the phase of the carrier in such a way that, for example, 16 periods of the carrier correspond to 1 bit data, thereby generating a transmit signal A4. The transmitter also includes a series resonator 4120 to locally suppress the amplitude of the magnetic signal B4 at phase change points in the transmit signal A4 according to the DPSK method, for example, over two periods of the carrier. This also locally suppresses the amplitude of a receive signal C4 in the receiver 4800, at the phase change points.

The receiver 4800 comprises a reception circuit 4030, an amplitude suppressed point detector 4410, a waveform shaping circuit 4420, a differential coding demodulator 4430 of a digital circuit, a sampling circuit 4050 of an synchronous series/parallel converter mainly consisting of ICs, a processor 4060, and a clock producing circuit 4100.

The reception circuit 4030 converts the magnetic signal B4 into the receive signal C4 and provides a power voltage Vcc, and the amplitude suppressed point detector 4410 receives the receive signal C4, executes full rectification and smoothing, and uses a binary-coded circuit 4413 to compare this signal to a predetermined threshold for digitalization, thereby generating an amplitude suppressed point detection signal G4 (see FIG. 8(c)). That is, a pulse amplitude suppressed point detection signal is sent out by decoding amplitude suppressed points from the receive signal C4 with its amplitude locally suppressed at phase change points according to the DPSK method.

Figure 5:
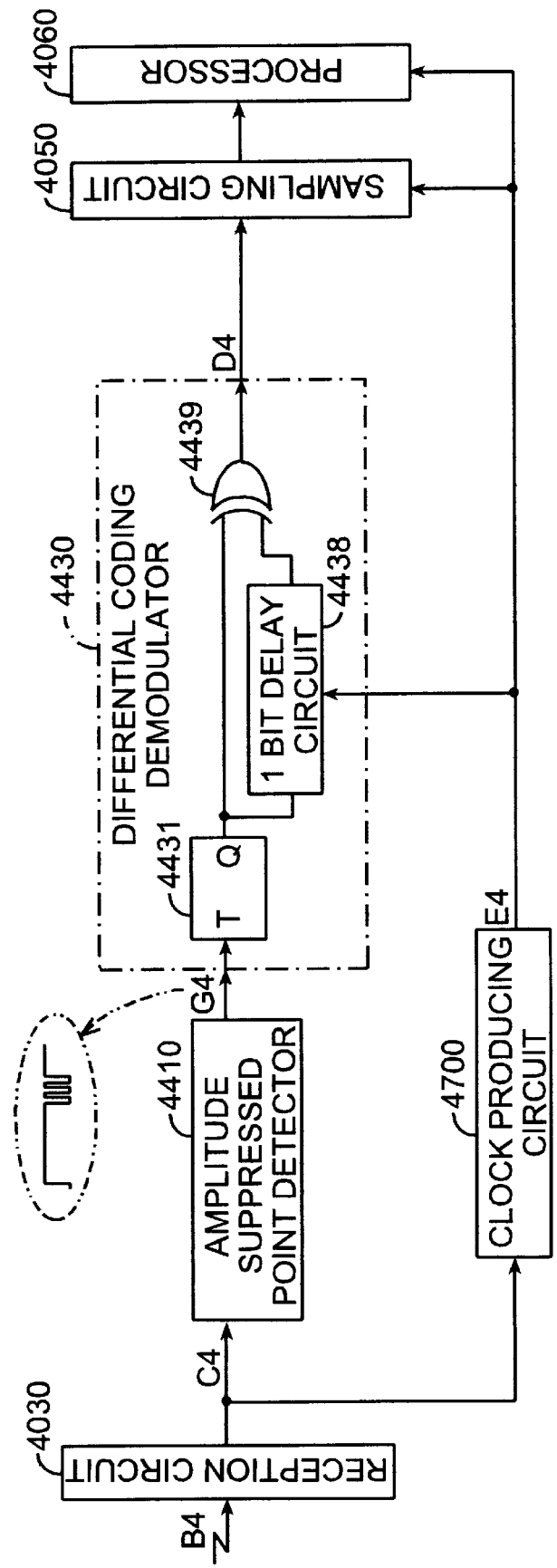
FIG. 5 is a partially detailed diagram of the receiver according to the first embodiment.

A clock producing circuit 4700 comprises a half wave rectification circuit 4701 that receives the receive signal C4 and a binary coding circuit 4702 composed of a buffer which digitalizes the rectified output with a predetermined threshold near the ground voltage GND and which also amplifies the output so as to output a clock E with a sufficient fan out (see FIGS. 4 and 5). Thus, the circuit 4700 has a simple constitution in which the carrier of the receive signal C4 is binary-coded to generate a clock. The clock E4 (see FIG. 8(b)) is supplied to a clock-synchronous differential coding demodulator 4430, a sampling circuit 4050, and a processor 4060.

The waveform shaping circuit 4420 comprises a D flip flop 4421 that receives an inverse of an amplitude suppressed point detection signal G4 as clock input, the power voltage Vcc as data input, and output L4 from the subsequent shift register 4422 as a reset input and which sends non-inverted output to the differential coding demodulator 4430 as a single pulse signal J4; and a 8 bit shift register 4422 that receives the clock E4 as clock input and a pulse signal M4 as data input.

The pulse signal M4 is a 1 clock wide pulse generated and output in synchronism with the clock E4 immediately after a falling transition of the single pulse signal J4 (see FIG. 8(g)). Thus, when the first pulse of the amplitude suppressed point detection signal G4 is input to the D flip flop 4421, the single pulse signal J4 makes a transition, followed by the pulse signal M4, which is delayed 8 clocks by the shift register 4422 to become output L4. The output L4 resets the D flip flop 4421 (see FIG. 8(f)). The single pulse signal J4 makes an inverse transition and returns to its initial state. In the meantime, since the D flip flop 4421 simply overlaps and latches the same voltages (Vcc) even if the amplitude suppressed point detection signal G4 contains other pulses, the single pulse signal J4 generally constitutes a single pulse of 8 clocks whether a single or a plurality of pulses are contained in the amplitude suppressed point detection signal G4 (see FIG. 8(d)).

Thus, the waveform shaping circuit 4420 is a clock-synchronous digital circuit that operates in response to the clock E4 and which in response to the amplitude suppressed point determination signal G4, outputs the single pulse signal J4 of a predetermined width corresponding to 8 clocks not only when one pulse is present within a predetermined period of 8 clocks which is longer than a local period of about 2 clocks during which the amplitude of the receive signal C4 is suppressed and which is also shorter than a period of 16 bit of data, that is, about 16 clocks but also when two or more pulses occur within the predetermined period. That is, a single pulse is output at each phase change point.

Instead of directly receiving the amplitude suppressed point detection signal G4, the differential coding demodulator 4430 receives the single pulse signal J4 output from the waveform shaping circuit 4420, and based on this signal, executes inverse differential coding to generate a demodulated signal D4.

Thus, the differential coding demodulator 4430 comprises a JK flip flop 4431 that receives the single pulse signal J4 and which, each time the pulse is received, performs a toggle operation for inverting an output value; and a D flip flop 4432 that receives output from the JK flip flop 4431 to latch the value in synchronism with the clock E4 in order to cause the rising/falling edge of the pulse to synchronize with the clock E4. The differential coding demodulator 4430 generates a digital signal K4 of a value corresponding to the phase state of the receive signal C4, from the single pulse signal J4 in synchronism with the clock E4 (FIG. 8(e)).

The differential coding demodulator 4430 also comprises a D flip flop 4433 that outputs the digital signal after delaying the digital signal K4 for one clock of the clock E4 and then inverting it; and an E-OR gate that receives both the digital signal K4 and the output of the D flip flop 4433 to output their exclusive OR as the pulse signal M4. The differential coding generator 4430 generates and outputs the pulse signal M4 with a 1 clock wide pulse at each rising/falling edge of the digital signal K4. Due to the process described above for generating the digital signal K4 from the single pulse signal J4, the pulse signal M4 is output in synchronism with the clock E4 immediately after the falling transition of the single pulse signal J4 (see FIG. 8(g)).

The differential coding demodulator 4430 further comprises a 4 bit binary counter 4435 that receives the pulse signal M4 an a load control input to output the most significant bit as a double frequency timing signal N4; and a low edge detector 4436 that receives the double frequency timing signal N4 to detect its rising transition in order to output a sampling timing signal S4 of a short pulse. The double frequency timing signal N4 is a digital signal with a 16 clock period which is normally inserted every 8 clocks. When, however, the pulse of the pulse signal M4 is received, the inversion timing is allowed to match this pulse (see FIG. 8(h)), so the somewhat disturbed waveform of the clock E4 or missing pulses at amplitude suppressed points such as phase change points does not produce accumulated effects. The sampling timing signal 84 is normally output every 16 clocks, that is, every 1 bit of data (see FIG. 8(l)).

The differential coding demodulator 4430 also comprises a D flip flop 4437 that receives the digital signal K4 as data input and the double frequency timing signal N4 as clock input, a D flip flop 4438 that receives non-inverted output 04 from the D flip flop 4437 as data input and the double frequency timing signal N4 as clock input, and an E-OR gate 4439 that receives both output 04 from the D flip flop 4437 and non-inverted output P4 from the flip flop 4438.

In this circuit, the D flip flop 4437 delays the digital signal K4 indicating the phase state of the receive signal C4, 8 clocks, that is, a half bit (see FIG. 8(i)), and the D flip flop 4438 further delays it 16 clocks, that is, 1 bit (see FIG. 8(j)). The E-OR gate 4439 then multiplies it by 1 bit and executes digital processing equivalent to delay detection. The demodulated signal D4 output from the E-OR gate 4439 is thus differeatially decoded. In addition, since the pulse of the sampling timing signal S4 generally lies in the center of a 16 clock period corresponding to each bit data, the somewhat disturbed waveform of the clock E4 or missing pulses at amplitude suppressed points such as phase change points is not inconvenient as long as it is within 7 clocks (see FIG. 8(k)).

In short, the differential coding demodulator 4430 is a clock-synchronous digital circuit that in response to the receive signal C4 differentially coded according to the DPSK method, carries out digital decoding based on the amplitude suppressed point detection signal G4 and which operates in response to the clock E4.

The sampling circuit 4050 and the processor 4060 provided as internal circuits are clock-synchronous digital circuits that operate in response to the clock E4 to receive the demodulated signal D4 in order to execute sampling or data processing depending on the signal D4. In particular, the sampling circuit 4050 includes an synchronous series/parallel converter because the data in not only the transmit signal A4 but also the receive and the demodulated signals C4 and D4 is bit-serialized according to the asynchronization method. The sampling circuit 4050 thus obtains the serial decoded signal D4 in response to the sampling timing signal S4 to convert it into parallel data of a predetermined number of bits before transmission to the processor 4060.

The specific operation of the receiver according to this embodiment is described. Thin embodiment is described with reference to the case in which original data of a bit pattern "001 . . . 1" is transmitted from the transmitter 4100 to a receiver 4800.

First, in the transmitter 4100, the synchronous series/parallel converter adds a start and a stop bits to the original data to generate a bit pattern "0001 . . . 1", and the modulator differentially codes it into a bit pattern "0100 . . ." and executes modulation in such a manner that the phase of the carrier is inverted/non-inverted every 16 periods so as to correspond to this bit pattern. The transmit signal A4 is thus generated, and the magnetic signal B4 the amplitude of which has been suppressed at phase change points by the series resonator 4120 is transmitted.

Next, in the receiver 4800, the reception circuit 4030 receives the magnetic signal B4 by converting it into the receive signal C4, and the clock producing circuit 4700 generates the clock E4 from the receive signal C4. The clock E4 is somewhat disturbed at the phase change point, but is basically a rectangular wave with the same frequency as the carrier (see FIG. 8(b)).

The amplitude suppressed point detector 4410 generates the amplitude suppressed point detection signal G4 from the receive signal C4. A group of pulses appear at the amplitude suppressed point, that is, the phase change point of the amplitude suppressed point detection signal G4. In the data according to this example, the subsequent group of pulses appear about 16 clocks after the first group of pulses and no pulses appear 16 clocks after the second group (see FIG. 8(b)).

The waveform shaping circuit 4420 shapes the amplitude suppressed point detection signal G4 to generate the single pulse signal J4. That is, 8 clocks wide pulses appear at 2 phase change points, but no pulses subsequently appear (see FIG. 8(d)). This corresponds to the bit pattern "0100 . . ." (see FIG. 8(e)).

Furthermore, the differential coding demodulator 4430 generates the demodulated signal D4 from the differential coding demodulator 4430 and demodulates the bit pattern "00 . . ." with a delay of 8 clocks (see FIG. 8(k)).

The sampling circuit 4050 then samples the demodulated signal D4. Sampling is prepared for using the first bit "O" as a start bit, and the center of each bit is sampled on the basis of the timing signal S4.

In this manner, the bit patter sequence "001 ....." of the original data except the start bit is reproduced, and the processor 4060 executes processing according to the contents of the data.

Fourth Embodiment

FIG. 9 is a block diagram of a demodulator in a data transmission and reception system according to a fourth embodiment of this invention. This block diagram shows an example of a function for the PSK signal, and in other words, describes a function starting with the reception of a signal by a non-contact IC card and ending with the detection of change points in the PSK signal.

In FIG. 9, 301 is an antenna coil; 302 is a diode bridge that is connected to both ends of the antenna coil 301, in which one of the intermediate points in grounded, and which acts an a rectifying circuit; 303 is an amplifier; 304 is a change point suppression circuit; 305 is an edge detector; 306 is a frequency divider; and 307 is a phase comparator. An output signal from the amplifier 303 is input to the change point suppression circuit 304 and supplied to the edge detector 305, and the phase comparator 307 as a clock. The output Vcc of the diode bridge 302 is used as a power supply for supplying power to other circuits.

The operation of the demodulator for PSK signals configured as described above in explained with reference to the drawings.

FIGS. 10(a)–10(g) are a waveform diagrams showing signals sent from each part of the demodulator shown in FIG. 9 in response to a PSK signal. A receive signal 319a, received by the antenna coil 301, passes through the diode bridge 302 and is input to the amplifier 303 as an input signal 320, in which it is amplified. The input signal 320 has a very small signal level at phase change points.

The amplifier 303 outputs a first binary-coded signal 321, which is then input to the change point suppression circuit 304. The change point suppression circuit 304 has an integration circuit. After passing through the integration circuit, the first binary-coded signal 321 has a delayed phase compared to its original state and changes cannot be detected due to a small amplitude, that is, a small pulse width at phase change points, resulting in a second binary-coded signal 322 with its portions near change points suppressed.

The edge detector 305 has an exclusive OR circuit (not shown) that Ex-ORs the first and second binary-coded signals 321 and 322 to synthesize the pulses indicating both ends of the second binary-coded signal 322 and those portions of the signals which have been suppressed by the delay circuit and disappeared, thereby obtaining a third binary-coded signal 323. The frequency of the synthesized third binary-coded signal 323 is divided by the frequency divider 306 to obtain a frequency-divided signal 324 with a frequency almost the same as that of the carrier of the original signal.

The frequency-divided signal 324 and the first binary-coded signal 321 are Ex-ORed by the phase comparator 307 to generate a first detection signal 325 indicating changes in the output at phase change points.

Beard-like noises may appear in the first detection signal that is the output of the phase comparator 307. In this case, a detection signal without such noises can be obtained by, for example, inputting the first detection signal 325 to the flip flop and inputting the second binary-coded signal as a clock.

FIGS. 11(a)–11(g) show waveform signals sent from the demodulator shown in FIG. 9 in response to a PSK signal. FIGS. 11(a)–11(g) differs from the waveform diagram shown in FIGS. 10(a)–10(g) in that a receive signal 319b have an inverted waveform relative to the receive signal 319a. After passing through the diode bridge, the receive signal 319b becomes an input signal 330. At this point, the output of the phase comparator 307 is a pulse-like signal as in the first detection signal 335.

Next, a method for shaping the first detection signal 335 to produce a second pulse-like detection signal is described.

FIG. 12 is a circuit diagram of a second detection signal producing circuit in the demodulator shown in FIG. 9. FIGS. 13(a) and 13(b) are waveform diagrams showing signals from the second detection signal producing circuit shown in FIG. 12.

The second detection signal producing circuit shown in FIG. 12 has a flip flop circuit 340 and an exclusive OR circuit 341. The first detection signal is input to the first input terminal 342 of the flip flop circuit 340, and the first binary-coded signal is input to a second input terminal 343 as a clock. An output signal from the flip flop circuit 340 is input to the first input terminal 344 of the exclusive OR circuit 341, and the first detection signal input to the first input terminal 342 is also input to a second input terminal 345.

A method for using the second detection signal producing circuit configured in this manner to generate a second detection signal in described below with reference to the waveform diagram shown in FIG. 10.

The first detection signal 325 is input to the first input terminal 342 of the flip flop circuit 340, and the first binary-coded signal 321 is input to a second input terminal 343 as a clock. The output of the flip flop circuit 340 has its phase delayed 1 bit relative to the first detection signal 325, as shown in the output signal 350 in FIG. 13(a). The output signal 350 and the first detection signal 320 can be used as input and Ex-ORed to generate a second detection signal 351 so as to detect it as a pulse signal at a change point.

Next, a method for obtaining a second detection signal from a first detection signal with & waveform different from that in FIG. 10 is described with reference to FIG. 13(b).

As in FIG. 13(a), a first detection signal 335 is input to the first input terminal 342 of the flip flop circuit 340, and a first binary-coded signal 331 is input to a second input terminal 343 as a clock. An output signal 352 output after passing through the flip flop circuit 340 and having its phase delayed 1 bit relative to the first detection signal 335 and the first detection signal 335 can be Ex-ORed to generate a second detection signal 353 so as to detect it as a pulse signal at a change point.

Although FIG. 11 has been described in conjunction with the suppression of 2 waves, 3 or more suppressed waves can be detected at change points as pulse signals using the same method. If the second detection signals 351, 353 can be detected, demodulation can be executed easily by, for example, differential coding. For 0° and 180° phase modulation, a signal is obtained from one end of the diode bridge 302, but a 2 circuit configuration with a similar detector added to the other end of the bridge 302 can be used to detect signals accurately.

When received, the clock signal shown in FIG. 9 does not provide a well-adjusted clock due to the modulation of the receive wave, but has the same frequency accuracy as the carrier when the receive wave is not modulated. During transmission, this signal can be used as a transmit clock in the case of a half-duplex method in which data is not received.

Fifth Embodiment

An amplifier that can be used in the transmitter of each of the first, second, third, and fourth embodiments is explained below as an amplifier in a receiver in a data transmission and reception system according to a fifth embodiment.

FIG. 14 is a block diagram of an amplifier in a receiver in a data transmission and reception system according to a fifth embodiment which is shown as an amplifier that can be used in the transmitter of each of the first, second, third, and fourth embodiments, and FIG. 15 is a waveform diagram showing signals from each part of the amplifier shown in FIG. 14 This embodiment is described with reference to a D-class amplifier driven by a single power supply.

The D-class amplifier with a single power supply shown in FIG. 14 comprises a first P channel FET 201, a first N channel FET 202, a second P channel FET 203, a second N channel FET 204, a series resonator 205 consisting of a capacitor and a coil, and an invertor 206.

The PSK-modulated digital signal 211 shown in FIG. 15(a)–15(e) (hereafter referred to as a "PSK signal 211") is input to a first input terminal 207. When the PSK signal 211 is "H", the first P channel FET 201 and the second N channel FET 204 are turned on, whereas the second P channel FET 203 and the first N channel FET 202 are turned off. A current 212 thus flows through the first P channel FET 201, the series resonator 205, and the second N channel FET 204 in this order.

When the PSK signal 211 is "L", the second P channel FET 203 and the first N channel FET 202 are turned on, whereas the first P channel FET 201 and the second N channel FET 204 are turned off. A current 213 thus flows through the second P channel FET 203, the series resonator 205, and the first N channel FET 202 in this order.

Thus, a current is efficiently supplied to the series resonator 205 from the power line Vcc whether the PSK signal 211 is "H" or "L". In addition, a synthetic current 214 (see FIG. 15) synthesized from the currents 212 and 213 flows through the series resonator 205, so the circuit 205 is driven by a voltage twice as large as the power supply voltage, thereby theoretically providing 100% efficiency.

The synthetic current 214 described above and flowing through the series resonator 205 is a sinusoidal current that consists of only basic frequency components and which does not contain high frequency components. Due to the inertia, however, the current has a continuous waveform at a change point as shown by an actual synthetic current 215 (see FIGS. 15(*a*)–15(*e*)), but has a smaller amplitude at such a point.

Next, another amplifier in the first, second, and third eabodiments is described.

FIG. 16 is a block diagram of another amplifier in the first, second, and third embodiments, which is basically configured and operates in the same manner as the D-class amplifier with a single power supply shown in FIG. 14. Thus, only the differences from the D-class amplifier with a single power supply are explained below.

In the D-class amplifier with a single power supply shown in FIG. 14, four FETs 201, 202, 203, and 204 are simultaneously switched and may thus be simultaneously turned on at transition points. In this case, a through current may flow through all the FETs, thereby increasing power consumption to degrade the FETs.

To prevent such a through current, the D-class amplifier with a single power supply has resistors 216*a* and 216*b* inserted between a first connection point 209 and the first P channel FET 201 and between the first connection point 209 and the first N channel FET 202, respectively, and resistors 217*a* and 217*b* inserted between a second connection point 210 and the second P channel FET 203 and between the second connection point 210 and the second N channel FET 204, respectively.

The insertion of the resistors 216*a*, 216*b*, 217*a*, and 217*b* prevents through currents, reduces power consumption, and improves reliability.

The four resistors 216*a*, 216*b*, 217*a*, and 217*b* desirably have almost the same value, but the following combination is possible.

Only the resistors 216*a* and 217*a* or the resistors 217*a* and 217*b* may be inserted. In either case, the resistors are inserted between the FETs to reduce through currents.

Although in the D-class amplifier with a single power supply shown in FIG. 16, each resistor has been shown to comprise a single resistor, it may comprises a plurality of resistors.

Although each of the above embodiments has been described as an output circuit according to the PSK modulation method, similar effects can be obtained using the ASK modulation method that turns the carrier on and off to transmit signals.

Although each of the above embodiments has been described in conjunction with the half rectification of a received PSK signal, the PSK signal can be similarly demodulated by changing the pickup point of the diode bridge 302 for full rectification.

Although each of the above embodiments has been described in conjunction with communication according to the DPSK method, this invention is directly applicable to other modulation methods that simply suppress the amplitude at locations corresponding to phase change points in a transmit and a receive signals according to the DPSK method, for example, an ASK method because all the signals used are exactly the same except that the waveform of the clock at amplitude suppression points in slightly different from that in the DPSK method (FIG. 8(*b*)) (see FIG. 8(*a*)).

We claim:

1. A data transmission and reception system, comprising
   (a) a transmitter for transmitting data by modulating transmit data, said transmitter including:
      a series resonator to which a PSK signal including said transmit data is provided: and
   (b) a receiver for receiving and demodulating a signal from the transmitter, said receiver including:
      (1) an amplitude suppressed point detector for using binary-coding based on comparison to a predetermined threshold to detect suppressed points from a receive signal the amplitude of which has been locally suppressed, thereby to send out a pulse amplitude suppressed point detection signal;
      (2) a waveform shaping circuit for outputting a single pulse signal of a predetermined width upon receiving said pulse amplitude suppressed point detection signal even when one or more pulses are generated, within a predetermined period that is longer than a local period in which the amplitude of said receive signal is suppressed, and wherein demodulation is carried out based on the output of said waveform shaping circuit;
      (3) a parallel resonator for receiving said PSK signal from said transmitter;
      (4) a full rectification circuit for detecting output from said parallel resonator (3);
      (5) a low pass filter for shaping the output waveform from said full rectification circuit (4);
      (6) a comparator for converting output from said low pass filter (5) into a binary-coded signal; and
      (7) a demodulator for obtaining a demodulated signal from the output of said comparator (6).

2. A data transmission and reception system according to claim 1 wherein said receiver includes a parallel resonator that comprises a capacitor and a coil and which receives a signal from the transmitter.

3. A data transmission and reception system according to claim 1 wherein said receiver comprises a full rectification circuit for detecting the amplitude of the receive signal; a low pass filter for shaping the waveform of the detected signal; and a comparator for comparing the shaped signal to a predetermined threshold to carry out binary-coding and wherein said receiver also has an amplitude suppressed point detector for detecting amplitude suppressed points in the receive signal.

4. A data transmission and reception system according to claim 1 wherein said receiver includes a clock producing circuit for binary-coding the carrier of the receive signal to produce a clock, and wherein at least part of said internal circuit is a clock-synchronous circuit that operates in response to said clock.

5. A data transmission and reception system according to claim 1 wherein because said receive signal has been obtained through differential coding such as DPSK, said demodulator carries out demodulation through inverse differential coding.

6. A data transmission and reception system according to claim 1 wherein because the data in said receive signal has been bit-serialized according to the asynchronization method, said internal circuit includes an asynchronous series/parallel converter and uses said asynchronous series/parallel converter to sample demodulated signals from said demodulator.

* * * * *